Patented Aug. 7, 1945

2,381,115

UNITED STATES PATENT OFFICE 2,381,115

NEW CHEMICAL COMPOUND AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application October 20, 1941, Serial No. 415,763. Divided and this application June 3, 1943, Serial No. 489,571

8 Claims. (Cl. 260—286)

This invention relates to a new chemical compound.

One object of our invention is to provide a new material or composition of matter, that is particularly adapted for use as a demulsifier in the resolution of crude oil emulsions, and which is also capable of use for various other purposes. For instance, the material may be used as a break inducer in doctor treatment of the kind intended to sweeten gasoline. Certain of the compositions of matter herein described are of value as surface tension depressants in the acidification of calcareous oil-bearing strata by means of strong mineral acid, such as hydrochloric acid. Similarly, some members are effective as surface tension depressants, or wetting agents in the flooding of exhausted oil-bearing strata.

And still another object of our invention is to provide a novel method of producing said new material or composition of matter.

The new material or composition of matter herein described consists of a quaternary compound of the pyridine series of the kind hereinafter described in detail. Members of the pyridine series suitable as reactants include pyridine, alkylated derivatives of pyridine, particularly alkylated derivatives, in which the alkyl radical contains three carbon atoms or less, and especially methylated pyridines, i. e., pyridines in which one, two, or three methyl groups have been substituted in the nucleus, such as picolines, lutidines, and collidines. Also suitable as reactants are the comparable quinolines and isoquinolines, along with C-methyl homologs thereof. Coal tar bases represent mixtures of suitable heterocyclic materials which may be used as such, or after suitable purification, without separation into the individual components.

Specifically, then, the compounds herein contemplated as demulsifiers, consist of the quaternary nitrogen products obtained by reacting one mole of hydroxy compounds of the formula:

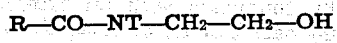
R—CO—NT—CH₂—CH₂—OH in which T is a member of the class consisting of hydroxyethyl radicals, alkyl radicals, aryl radicals, aralkyl radicals, and alicyclic radicals having not more than 22 carbon atoms; RCO denotes an acyl radical derived from a detergent-forming monocarboxy acid, with a heterocyclic compound of the pyridine series selected from the group consisting of pyridine, quinoline, isoquinoline, and C-methyl homologs thereof, in the presence of substantially one mole of halogen hydride at an elevated temperature, the heterocyclic compound being applied in an amount substantially equivalent to the halogen hydride, and usually in excess thereof, i. e., the reaction being conducted in the presence of the free base.

It is well known that certain monocarboxy organic acids containing 8 carbon atoms or more, and not more than 32 carbon atoms, are characterized by the fact that they combine with alkalies to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids; for instance, instead of fatty acids, one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course, this is also true in regard to derivatives of the kind indicated, insofar that such derivatives are obtained from higher fatty acids. The petroleum acids include not only naturally-occurring naphthenic acids, but also acids obtained by oxidation of wax, paraffin, etc. Such acids may have as many as 32 carbon atoms. For instance, see U. S. Patent No. 2,242,837, dated May 20, 1941, to Shields.

As to a description of a somewhat analogous type of compound, see U. S. Patent No. 2,242,211, dated May 20, 1941, to Haack.

See also our U. S. Patent No. 2,273,181, dated February 17, 1942.

The manufacture of substituted amides, or rather, substituted hydroxylated amides suitable for reaction with pyridine hydrochloride, or the like, is well known. For instance, a selected high molal monocarboxy acid can be reacted with diethanolamine, ethyl ethanolamine, propyl ethanolamine, octadecyl ethanolamine, or the like. Similarly, one may employ benzyl ethanolamine, cyclohexyl ethanolamine, phenylethanolamine, or similar amines, in which the high molal acyl radical is derived from fatty acids or wax acids having as many as 22 carbon atoms.

Other procedures may be employed. For example, an amide, such as oleoamide, ricinoleoamide, stearamide, or the like, may be treated with two moles of ethylene oxide to give the bis(hydroxyethyl) amide. Similarly, an amide may be derived from a non-hydroxylated primary amine, such as, for example, amylamine, aniline, cyclohexylamine, benzylamine, decylamine, or various normal primary amines containing 12-18 carbon atoms, and derived from various fatty acids. Such substituted amides can then be treated with a mole of ethylene oxide, so as to yield the hydroxyethyl derivative. As to the preparation of hydroxylated amides, see also U. S. Patent No. 2,106,241, dated January 25, 1938, to De Groote.

Although any of the high molal monocarboxy acids can be converted into the substituted hydroxyethyl amides readily by reaction with monoethanolamine, or by other conventional procedure, for instance, reaction of the amide with one mole of ethylene oxide, it is our preference to employ hydroxyethyl amides derived from the higher fatty acids, rather than from petroleum acids, rosin acids, and the like. We have found that by far the most effective demulsifying agents are obtained from unsaturated fatty acids having 18 carbon atoms. Such unsaturated fatty acids include the fatty acids, such as oleic acid, ricinoleic acid, linoleic acid, linolenic acid, etc. One may employ mixed fatty acids, as, for example, the fatty acids obtained from hydrolysis of cottonseed oil, soyabean oil, corn oil, etc. Our preferred demulsifier is obtained from unsaturated fatty acids, and more especially, unsaturated fatty acids containing a hydroxyl radical, or unsaturated fatty acids which have been subjected to an oxidation or oxyalkylation step, such as oxyethylation.

In view of what has been said, and particularly by reference to the aforementioned Haack patent, it will be noted that compounds of the type herein contemplated as demulsifiers, may be indicated by the following formula:

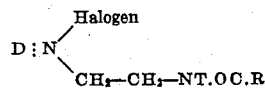

in which T is a member of the class consisting of alkyl radicals, aryl radicals, aralkyl radicals, and alicyclic radicals having not more than 22 carbon atoms; the acyl radical RCO is derived from a monocarboxy detergent-forming acid having at least 8 carbon atoms and not more than 32 carbon atoms; and D:N represents a heterocyclic compound of the pyridine series, consisting of pyridine, quinoline, isoquinoline, and C-methyl homologs thereof. The halogen, of course, is most suitably chlorine or bromine; but iodine may be employed except for its excessive cost. More correctly, D:N is contemplated as a radical, rather than a compound.

Compositions or compounds of the kind herein described, may be exemplified by the following examples:

*Example 1*

570 grams of a fatty acid diethanolamide, obtained by reaction of split cocoanut oil (containing all the natural acids, beginning with the capric up to stearic, and some oleic), with diethanolamine, 330 g. hydrochloride of a fraction of pyridine bases (50% distilling up to 140° C., 90% distilling up to 160°, completely soluble in water) and 100 g. of the mixture of the free pyridine bases, are heated at 100° C. until the product is, for the most part, soluble in water and stable towards diluted sodium carbonate solution. After being separated from the primary compounds not reacted upon, the mixture of pyridinium-, picolinium- and other homologous pyridinium compounds obtained may be further worked up to form a 10% water solution.

When working at 150-160°, the reaction is more rapid.

Furthermore, pure pyridine may be used instead of a mixture of pyridine bases. (Compare with Example 2 of the aforementioned Haack Patent No. 2,242,211.)

*Example 2*

Bis(hydroxyethyl) ricinoleoamide derived by reaction between ricinoleic acid and diethanolamine, is substituted for the amide employed in Example 1, preceding.

*Example 3*

A drastically oxidized castor oil having approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl number | 168.0 to 220.0 |
| Percent unsaponifiable matter | 1.1 |
| Percent nitrogen | 0.0 |
| Percent SO₃ | 0.0 |
| Percent ash | Trace | is converted into the di(hydroxyethyl) amide by reaction with diethanolamine. Such amide is substituted for the amide employed in Example 1, preceding.

*Example 4*

Phenylstearic acid is prepared in any suitable manner, as, for example, in the manner described in U. S. Patent No. 2,081,075, dated May 18, 1937, to Bobach. This acid is converted into bis(hydroxyethyl) phenylstearamide, by reaction with diethanolamine; and such amide is employed in the manner described in Example 1, preceding.

*Example 5*

Ethyl ethanolamine is substituted for diethanolamine in the preceding four examples.

*Example 6*

Benzyl ethanolamine is substituted for diethanolamine in Examples 1-4, preceding.

*Example 7*

Cyclohexyl ethanolamine is substituted for diethanolamine in Examples 1-4, preceding.

*Example 8*

High molal primary amines derived from fatty acids having 16-22 carbon atoms, are treated with one mole of ethylene oxide and such ethanolamine substituted for diethanolamine in Examples 1-4, preceding.

*Example 9*

Phenylethanolamine is substituted for ethanolamine of diethanolamine in previous examples, so as to yield an amide having both a phenyl group and a hydroxyethyl group directly attached to the amino nitrogen atom.

The manufacture of the above compounds is usually conducted with an excess of the pyridinium base halide, such as the hydrochloride, or hydrobromide, and usually in the presence of a significant amount of the free pyridinium base itself. In many instances, however, there is no need to use an excess of the pyridinium base halide, and, in fact, no need to have present any of the free pyridinium base itself, or, at the most, only a trace of the free base.

As is obvious, other monovalent anions may replace the halogen and serve as a functional equivalent.

A somewhat analogous use of our demulsifying agent is in the removal of a residual mud sheath which remains after drilling a well by the rotary method. Sometimes the drilling mud contains added calcium carbonate or the like to render the mud susceptible to reaction with hydrochloric acid or the like, and thus expedite its removal.

It has been pointed out that the present invention is concerned not only with a new chemical compound for breaking petroleum emulsions of the water-in-oil type in various forms, as already described, but the present invention is also concerned with a method of preparing the same. Such new compounds are of utility, not only for the purposes specifically enumerated in detail, but also find application in various industries, processes, and for various uses where wetting agents of the conventional type are used. As to some of such uses which are well known, see "The expanding application of wetting agents," Chemical Industries, volume 48, page 324 (1941).

Attention is directed to U. S. Patent No. 2,273,181, dated February 17, 1942, to De Groote and Keiser. Said patent contemplates resolution of petroleum emulsions of the water-in-oil type by means of demulsifiers of the following formula type:

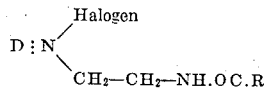

in which the acyl radical RCO is derived from a monocarboxy detergent-forming acid having at least 8 carbon atoms and not more than 32 carbon atoms; and D:N represents a heterocyclic compound of the pyridine series consisting of pyridine, quinoline, isoquinoline, and C-methyl homologs thereof. The halogen, of course, is most suitably chlorine or bromine, but iodine may be employed except for its excessive cost. More correctly, D:N is contemplated as a radical, rather than a compound.

Attention is also directed to our co-pending applications, Serial Nos. 415,764, 415,765 and 415,766, all filed Oct. 20, 1941.

The present application is a division of our pending application Serial No. 415,763, filed Oct. 20, 1941; which subsequently matured as U. S. Patent No. 2,329,700, dated September 21, 1943.

Having thus described our invention, what we claim as new and desire to secure by Letters Patent is:

1. A chemical compound of the following type:

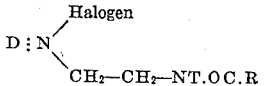

in which T is a monovalent hydrocarbon radical having at least 6 and not more than 22 carbon atoms; the acyl radical RCO is derived from a monocarboxy detergent-forming acid having at least 8 and not more than 32 carbon atoms; and D:N represents a heterocyclic compound of the pyridine series consisting of pyridine, quinoline, isoquinoline, and C-methyl homologs thereof.

2. A chemical compound of the following type:

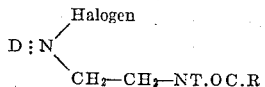

in which T is a monovalent hydrocarbon radical having at least 6 and not more than 22 carbon atoms; the acyl radical RCO is derived from a higher fatty acid having at least 8 and not more than 32 carbon atoms; and D:N represents a heterocyclic compound of the pyridine series consisting of pyridine, quinoline, isoquinoline, and C-methyl homologs thereof.

3. A chemical compound of the following type:

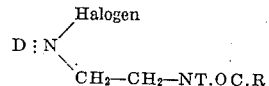

in which T is a monovalent hydrocarbon radical having at least 6 and not more than 22 carbon atoms; the acyl radical RCO is derived from a higher unsaturated fatty acid having at least 8 and not more than 32 carbon atoms; and D:N represents a heterocyclic compound of the pyridine series consisting of pyridine, quinoline, isoquinoline, and C-methyl homologs thereof.

4. A method of manufacturing chemical compounds of the following type:

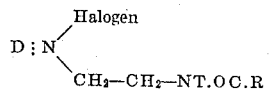

in which T is a monovalent hydrocarbon radical having at least 6 and not more than 22 carbon atoms; the acyl radical RCO is derived from a monocarboxy detergent-forming acid having at least 8 and not more than 32 carbon atoms; and D:N represents a heterocyclic compound of the pyridine series consisting of pyridine, quinoline, isoquinoline, and C-methyl homologs thereof, by reacting the base hydrohalide,

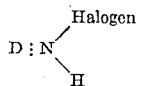

with an amide of the following formula:

OH.CH$_2$—CH$_2$—NT.OC.R said method involving the step of reacting a hydroxy compound of the formula type:

R—CO—NT—CH$_2$—CH$_2$—OH in which RCO and T have their previous significance, with a hydrohalide of a heterocyclic compound of the pyridine series, so as to supply the radical

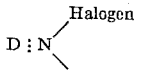

5. A chemical compound of the following formula:

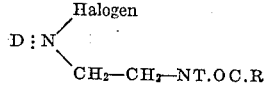

in which T is a monovalent hydrocarbon radical having at least 6 carbon atoms and not more than 22 carbon atoms; RCO is the ricinoleyl radical and D:N represents a heterocyclic compound of the pyridine series consisting of pyridine, quinoline, isoquinoline, and C-methyl homologues thereof.

6. A chemical compound, described as in claim 5, wherein T is the benzyl radical.

7. A chemical compound, as described in claim 5, wherein T is the cyclohexyl radical.

8. A chemical compound, as described in claim 5, wherein T is an alkyl radical having 16 to 22 carbon atoms.

MELVIN DE GROOTE.
BERNHARD KEISER.